US009864981B1

(12) United States Patent
Young et al.

(10) Patent No.: US 9,864,981 B1
(45) Date of Patent: Jan. 9, 2018

(54) SYSTEMS AND METHODS FOR PAYMENT AT A POINT OF SALE

(71) Applicant: United Services Automobile Association, San Antonio, TX (US)

(72) Inventors: Barrington Riverton Saint Aloysius Young, Austin, TX (US); Bharat Prasad, San Antonio, TX (US); Bradly Jay Billman, San Antonio, TX (US)

(73) Assignee: UNITED SERVICES AUTOMOBILE ASSOCIATION (USAA), San Antonio, TX (US)

( * ) Notice: Subject to any disclaimer, the term of this patent is extended or adjusted under 35 U.S.C. 154(b) by 0 days.

(21) Appl. No.: 15/375,359

(22) Filed: Dec. 12, 2016

Related U.S. Application Data

(63) Continuation of application No. 13/595,884, filed on Aug. 27, 2012, now abandoned, which is a continuation of application No. 12/408,935, filed on Mar. 23, 2009, now Pat. No. 8,255,278.

(51) Int. Cl.
*G06Q 20/00* (2012.01)
*G06Q 20/20* (2012.01)
*G06Q 20/32* (2012.01)
*G06Q 20/10* (2012.01)
*G06Q 40/00* (2012.01)

(52) U.S. Cl.
CPC ......... *G06Q 20/202* (2013.01); *G06Q 20/102* (2013.01); *G06Q 20/206* (2013.01); *G06Q 20/209* (2013.01); *G06Q 20/3278* (2013.01); *G06Q 40/128* (2013.12)

(58) Field of Classification Search
CPC . G06Q 30/06; G06Q 30/0253; G06K 7/10089
USPC ............................................... 705/16, 17, 24
See application file for complete search history.

(56) References Cited

U.S. PATENT DOCUMENTS 5,940,475 A * 8/1999 Hansen ............. H04M 3/42314
379/52
8,818,872 B2 8/2014 Pratt et al.
(Continued)

FOREIGN PATENT DOCUMENTS

EP 1927944 A2 * 6/2008

OTHER PUBLICATIONS

Bitpipe, "Mobile Payments," 1 page, Jan. 28, 2009.
(Continued)

*Primary Examiner* — Rokib Masud
(74) *Attorney, Agent, or Firm* — Perkins Coie LLP

(57) ABSTRACT

Systems and methods are provided for making purchases at a merchant point-of-sale (POS) device using a mobile device. Transaction information may be communicated from the POS device to the mobile device and an authorization from the purchaser to proceed with the transaction returned to the POS device from the mobile device. After authorization, the POS device may communicate the transaction information together with an identifier of the mobile device to a financial institution to process payment. The financial institution may confirm the transaction with the purchaser at the mobile device using the identifier of the mobile device. Upon receiving a confirmation response from the mobile device, the financial institution may then transfer funds from a purchaser account to a merchant account.

20 Claims, 7 Drawing Sheets

(56) References Cited

U.S. PATENT DOCUMENTS

| | | | |
|---|---|---|---|
| 2004/0236647 A1* | 11/2004 | Acharya | G06Q 20/0425 |
| | | | 705/30 |
| 2006/0131385 A1* | 6/2006 | Kim | G06Q 20/24 |
| | | | 235/379 |
| 2007/0203836 A1* | 8/2007 | Dodin | G06Q 20/02 |
| | | | 705/44 |
| 2008/0091544 A1 | 4/2008 | Linlor | |
| 2008/0275779 A1 | 11/2008 | Lakshminarayanan | |
| 2009/0018954 A1 | 1/2009 | Roberts | |
| 2009/0024533 A1 | 1/2009 | Fernandes et al. | |

OTHER PUBLICATIONS

Epper, Karen. "At World Series, MasterCard Offering Wireless Approvals Series: 17." American Banker (pre-1997 Fulltext) Oct. 25, 1993, Accounting & Tax Periodicals, ProQuest. Web. Apr. 20, 2012.

Gao, Jerry et al., "P2P-Paid: A Peer-To-Peer Wireless Payment System," IEEE, 10 pages, 2005.

Tiwari, Ayu et al., "A Multi-Factor Security Protocol for Wireless Payment-Secure Web Authentication Using Mobile Devices," IADIS, ISBN 978-972-8924-30-0, 8 pages, 2007.

U.S. Appl. No. 13/595,884, filed Aug. 27, 2012, Systems and Methods for Payment at a Point of Sale Using a Virtual Check.

U.S. Appl. No. 12/408,935, filed Mar. 23, 2009, Systems and Methods for Payment at a Point of Sale Using a Virtual Check.

* cited by examiner

SYSTEMS AND METHODS FOR PAYMENT AT A POINT OF SALE

CROSS-REFERENCES

This application is a continuation of U.S. patent application Ser. No. 13/595,884, entitled "SYSTEMS AND METHODS FOR PAYMENT AT A POINT OF SALE USING A VIRTUAL CHECK," filed Aug. 27, 2012, which is a continuation U.S. patent application Ser. No. 12/408,935, entitled "SYSTEMS AND METHODS FOR PAYMENT AT A POINT OF SALE USING A VIRTUAL CHECK," filed Mar. 23, 2009, now U.S. Pat. No. 8,255,278, issued on Aug. 28, 2012. The entire contents of the above patent applications are incorporated by reference as part of the disclosure of this patent document.

BACKGROUND

Payments using mobile devices began as simple interactions that would allow a mobile device holder to pay for items within vending machines using a mobile device. Short Message Service (SMS) messages may be used to communicate such payments by entering a code associated with a particular vending machine. The message is received by the vending machine, the item is dispensed, and a mobile device holder's account is debited the appropriate amount for the selected item. Over time, mobile payments have grown to include mobile banking and mobile credit cards. Mobile devices may be used to transfer money from one mobile banking account to another, pay utility bills, pay parking fees, etc.

However, mobile devices have not gained wide acceptance for use as payment vehicles at a point-of-sale (POS) in, e.g., merchant locations. Here, the traditional payment vehicles, e.g., credit/debit cards, cash and checks still reign supreme. This is because POS terminals must undergo a certification process with back-end transaction processors to ensure compatibility with their systems and compliance with security regulations.

SUMMARY

Systems and methods are provided for making purchases at a merchant point-of-sale (POS) device using a mobile device. Transaction information may be communicated from the POS device to the mobile device and an authorization from the purchaser to proceed with the transaction returned to the POS device from the mobile device. After authorization, the POS device may communicate the transaction information together with an identifier of the mobile device to a financial institution to process payment. The financial institution may confirm the transaction with the purchaser at the mobile device using the identifier of the mobile device. Upon receiving a confirmation response from the mobile device, the financial institution may then transfer funds from a purchaser account to a merchant account. A confirmation of the transfer may be provided to the merchant and the purchaser, after which, the transaction may be completed at the merchant POS device where a receipt is printed and provided to the purchaser.

It should be noted that this summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The foregoing summary, as well as the following detailed description, is better understood when read in conjunction with the appended drawings. The following figures are included.

DETAILED DESCRIPTION

Certain specific details are set forth in this description and accompanying figures to provide a thorough understanding of various aspects of the presently disclosed subject matter. However, certain well-known details often associated with computing and software technology are not set forth in this disclosure in order to avoid unnecessarily obscuring these various aspects. Further, those of ordinary skill in the relevant art will understand that they can practice other aspects of the presently disclosed subject matter without one or more of the details described below. Finally, while various methods are described with reference to steps and sequences in this description, the description as such is for providing a clear implementation of the aforementioned aspects, and the steps and sequences of steps should not be taken as required to practice this subject matter.

Figure 1:
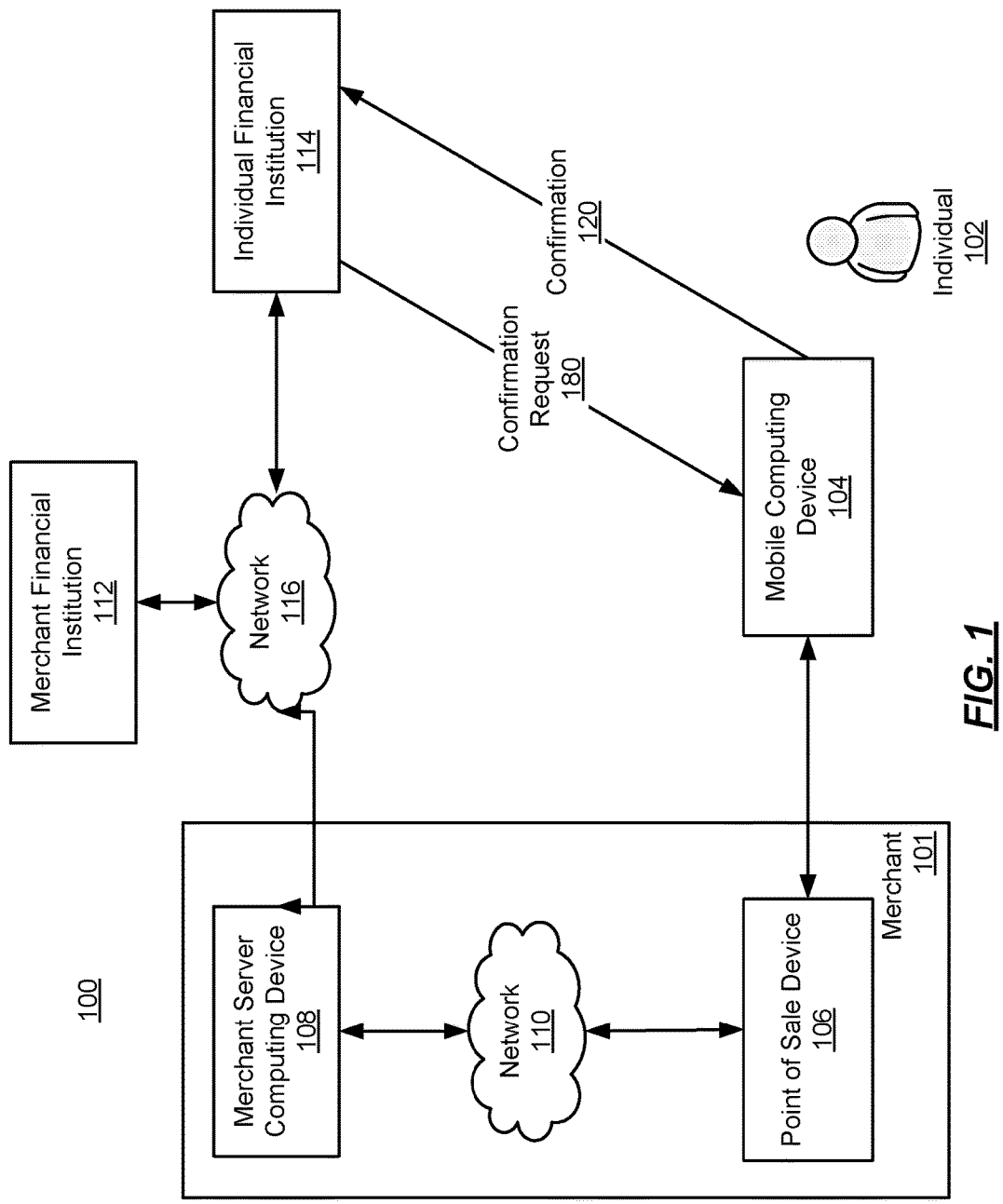
FIG. 1 illustrates an example environment that may be used for payment at a point of sale using a virtual check using a mobile device.

FIG. 1 illustrates an example environment 100 that may be used for payment at a point of sale using a virtual check using a mobile device. In FIG. 1, an individual 102 having a mobile computing device 104 may desire to make a purchase from a merchant 101. The merchant 101 may have a point of sale device 106 (e.g., cash register, credit/debit card reader, contactless reader) by which transactions for goods are made. The point of sale device 106 may communicate with a merchant server computing device 108 using a network connection 110.

The mobile computing device 104 may be a personal digital assistant, a mobile phone, a personal portable computer, etc. The mobile computing device 104 may be capable of sending text messages, making voice calls, Internet browsing, personal organizer functions, e-mail, instant messaging, and infrared, near field communication (NFC) and BLUETOOTH connectivity.

NFC is a short-range high frequency wireless communication technology that enables the exchange of data between devices over a limited range of 10 cm. NFC is an extension of the ISO 14443 proximity-card standard (contactless card RFID) and may be considered a near field effect communication technique. BLUETOOTH is a wireless protocol for exchanging data over short distances, and uses frequency-hopping spread spectrum communications techniques to achieve a data rate of 1 Mb/s (or higher). BLUETOOTH provides a way to connect and exchange information between devices using the 2.4 GHz short-range radio frequency bandwidth. In accordance with some implementations, NFC or BLUETOOTH may be used to establish communications between the mobile computing device 105 and the point of sale device 106.

The merchant server computing device 108 may be connected to a network connection 116 to communicate with a merchant financial institution 112. An individual financial institution 114 may also communicate using the network connection 116. The network connection 110 and network connection 116 may be a communications connection such as an intranet, the Internet, a local area network (LAN), a wide area network (WAN), a public switched telephone network (PSTN), a cellular network, a voice over Internet protocol (VoIP) network, Wi-Fi, and the like.

The merchant 101 may hold an account at the merchant financial institution 112. The account may be any type of account for depositing funds, such as a savings account, a checking account, a brokerage account, and the like. The merchant server computing device 108 may communicate with merchant financial institution 112 or the individual financial institution 114 by way of the communications network 116 to send and receive information regarding transactions made at the point of sale device 106.

Figure 2A:
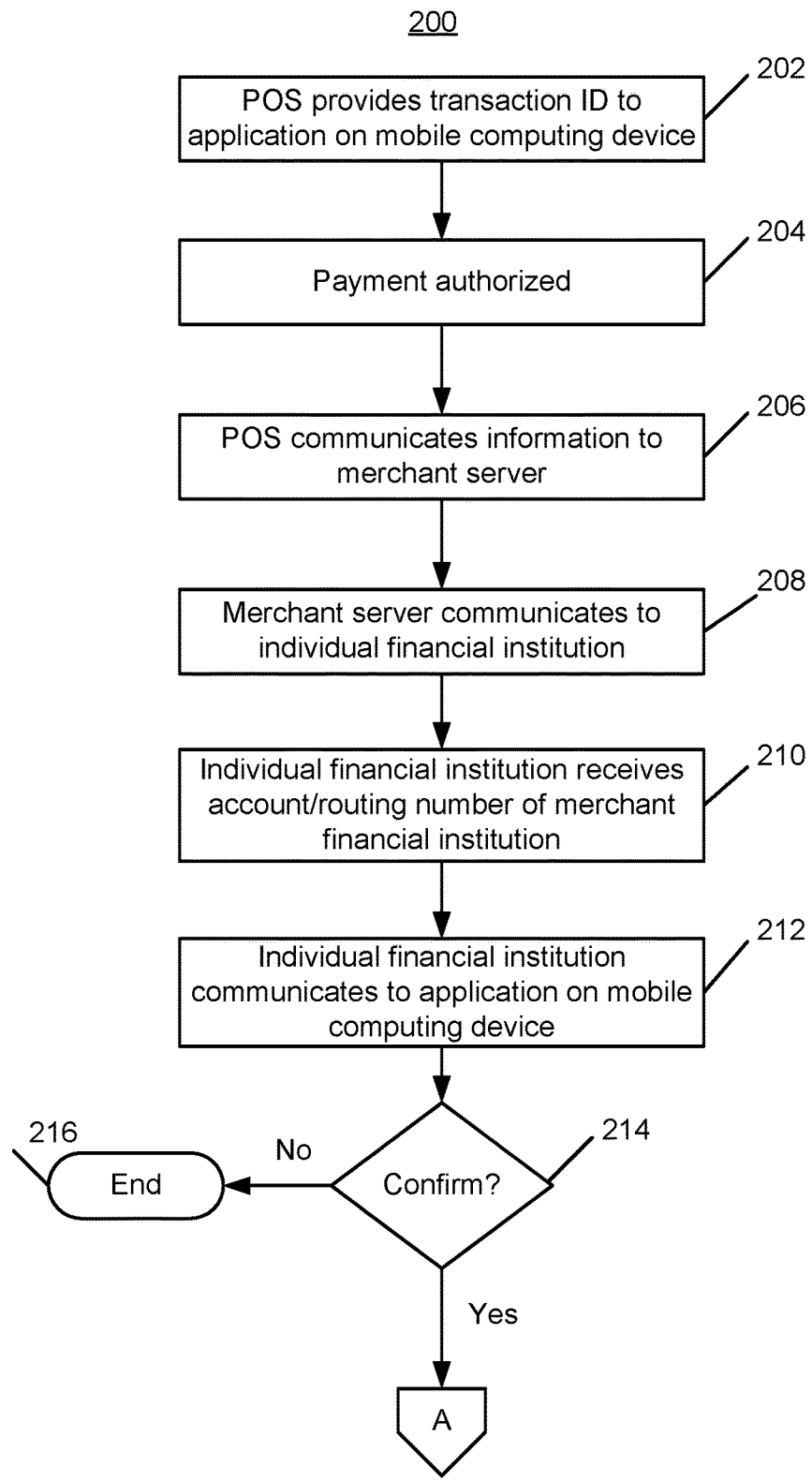
FIGS. 2A and 2B illustrate an example operation flow whereby transactions may be made using a virtual check.
Figure 2B:
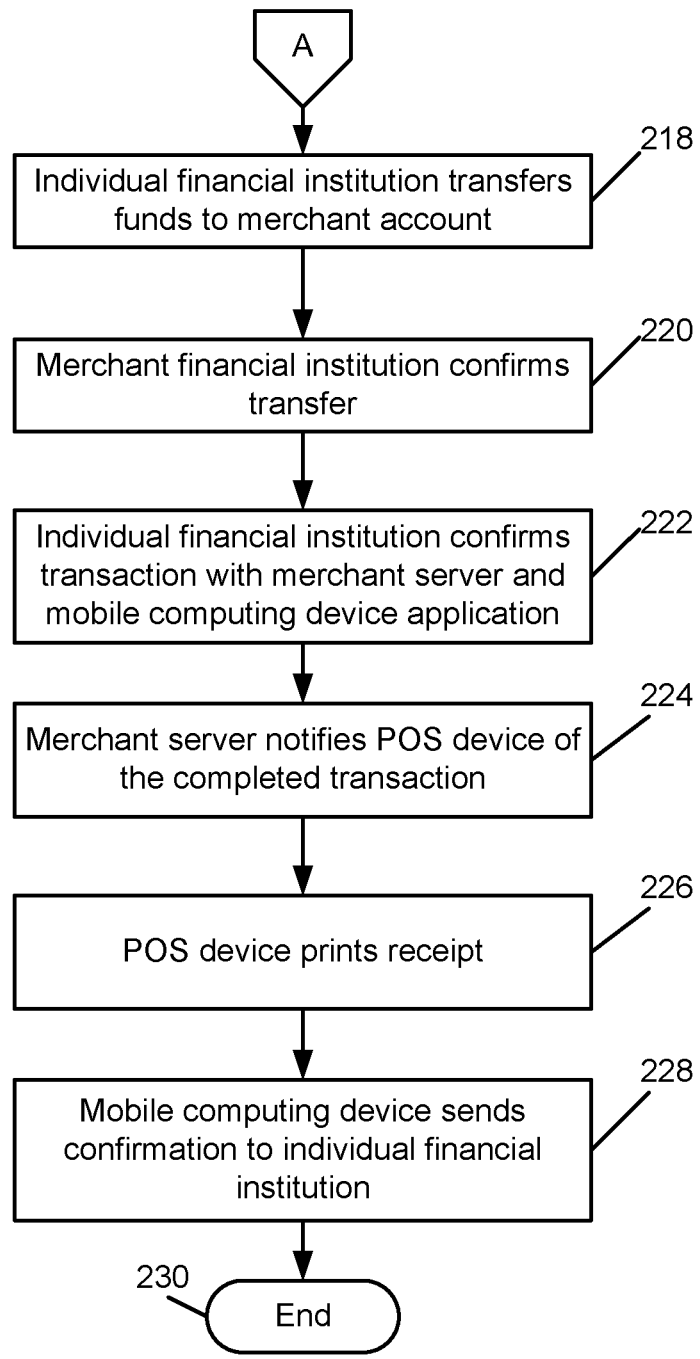

FIGS. 2A and 2B illustrate an example operation flow 200 whereby transactions may be made using a virtual check. As will be described, the merchant 101 may receive a payment to complete a transaction from the individual 102 in the form of a virtual check that is drawn from an account at individual financial institution 114. The individual 102 may make the payment at the point-of-sale device 106 using the mobile computing device 104. The operational flow may begin after the individual 102 presents merchandise at the point-of-sale device (POS) 106 for payment.

At 202, the point-of-sale device provides a transaction ID to an application running on the mobile computing device. For example, using an NFC or Bluetooth connection established between the point-of-sale device 106 and mobile computing device 104, an application running on the mobile computing device 104 may receive transaction information from the merchant 101. The application may be a "virtual checkbook" that provides a check register interface. The virtual checkbook application may show recent transactions, an account balance, etc., to provide current balance information about the individual's account with the individual financial institution 114. The individual 102 may enter and/or receive transaction information into the virtual checkbook application. For example, the individual 102 may enter a merchant name, a transaction categorization (e.g. groceries, gasoline, etc.) and an amount into the register interface. The transaction ID may be a unique identifier of the transaction between the merchant 101 and the mobile computing device 104, and may be populated automatically or manually into the register interface.

At 204, the payment to the merchant is authorized using the application on the mobile computing device. The application may include a "send" or "purchase" option that may be selected by the individual 102 to indicate that the transaction is authorized for payment to the merchant 101. The authorization may include a telephone number of the mobile computing device 104, an e-mail address associated with the individual 102, an Internet Protocol address, or other identifier such that an electronic message, telephone call, SMS message, etc. may be communicated to the mobile device 104 at a later time.

At 206, the point of sale device communicates information about the transaction to the merchant server computing device. This may include the transaction ID and the information acquired at 204. At 208, the merchant server computing device communicates with the individual financial institution to request a transfer of funds to the merchant financial institution at an account associated with the merchant. For example, the merchant server computing device 108 may communicate a merchant account number and a routing number of the merchant financial institution 112 to the individual financial institution 114.

At 210, information regarding the transaction may be received by the individual financial institution. This information may include the transaction ID, a merchant identifier, an amount, identification of the goods or products to be purchased, the mobile device information, etc., and may be communicated to the individual financial institution 114 at 208.

At 212, the individual financial institution may send a confirmation request to the application on the mobile computing device. A confirmation request 118 may be communicated to the mobile computing device 104 using the information indicated at 204 to the individual financial institution 114. As such, a confirmation request 118 may be an e-mail, text message, telephone call etc. to the mobile computing device 104 to request a confirmation from the individual 102 that the transaction is to be completed.

At 214, it is determined if the confirmation is received. Using the mobile computing device 104, the user 102 may communicate a confirmation 120 to the individual financial institution 114 that the transaction is to be completed with the merchant 101. Only after receiving the confirmation 120, would the individual financial institution 114 send transaction approval information to the merchant server computing device 108 and transfer funds to the merchant financial institution 112.

In some implementations, the confirmation request 118 may request that the individual 102 approve a purchase within a predetermined amount of time or for a predetermined amount of money. Thus, individuals 102 may be allocated several minutes to "opt-out" of a purchase by sending a "no" response; alternatively, individuals 102 could "opt-in" by sending a "yes" response, depending on the system implementation. In some implementations, individuals 102 may not want to receive such requests 118; thus, a configuration option may be set that a confirmation request 118 is sent only if a purchase is above an amount (e.g., $100). Furthermore, a combination of these two confirmation requests could be used.

For example, an individual 102 may configure options of three minutes for sending a confirmation 120, and $100 dollars as a threshold for sending a request 118. Thus, if a purchase was under $100 dollars and the confirmation 120 took more than three minutes to complete, a purchase may be conducted automatically (i.e., transactional approval information may be sent to a merchant 101, even if the confirmation 120 had not been received). However, if a purchase was over $100 and a confirmation 118 took over three minutes, the purchase could be delayed or canceled, or another confirmation request 118 may be sent to mobile computing device 104 (or different device).

If the confirmation is not received, then the process ends at 216. However if a confirmation is received, then at 218, the individual financial institution transfers the funds to the merchant account at the merchant financial institution. The transfer funds may be accomplished using an ACH transfer, wire transfer, mailing the physical check, etc. At 222, the individual financial institution confirms the transaction with the merchant server computing device and the mobile computing device. For example, the individual financial institution 114 may send a message over the network connection 116 to the merchant server computing device 180 to indicate the funds had been transferred from the individual's account at the individual financial institution 114 to the merchant's account at the merchant financial institution 112. Likewise, an e-mail, text message, phone call, etc. may be communicated to the mobile computing device 104. The mobile computing device 104 may indicate the confirmation by e.g., changing a color of the transaction in the virtual checkbook application. This provides the appearance that the "check" associated with the transaction between the individual 102 and the merchant 101 has cleared. In addition, a running account balance displayed in the application may be updated to reflect the debit to the individual's account at the individual financial institution 114.

At 224, the merchant server computing device notifies the point-of-sale device of the completed transaction. A message may be communicated from the merchant server computing device 108 using a network connection 110 to the point-of-sale device 106 to activate a process whereby the transaction is completed. At 226, the point-of-sale device prints a receipt and a transaction is completed. Optionally, at 228, the mobile computing device 104 may send a confirmation to the individual financial institution of the completed transaction. For example, the individual one or two using the application running on the mobile computing device 104 may indicate to the individual financial institution 114 that the transaction has been completed to the individual's satisfaction. At 230, the process ends.

Figure 3:
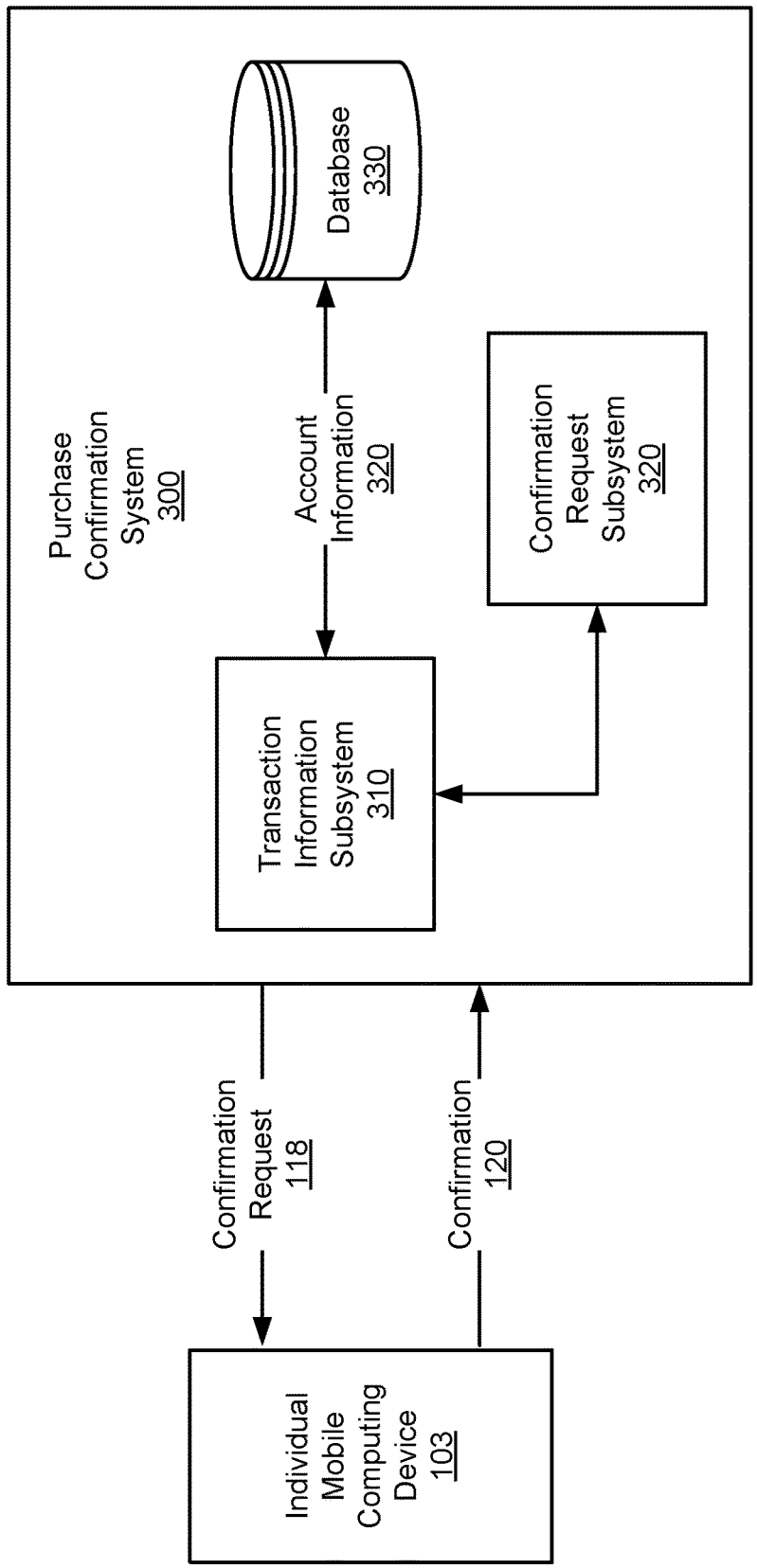
FIG. 3 illustrates in more detail the various subsystems that may be used in the environment of with reference to FIG. 1.

FIG. 3 illustrates in more detail the various subsystems that may be used in the environment 100 with reference to FIG. 1. It should be understood that any system or subsystem thereof may be practiced as a method or implemented in computer executable instructions storable on computer readable media; thus, such systems and subsystems are merely exemplary and non-limiting. In FIG. 3, a purchase confirmation system 300 may reside on a financial institution server. This system 300 may include additional subsystems comprising modules (if software) and/or devices (if hardware). These subsystems are broadly represented by a general transaction information subsystem 310.

Thus, the system 300 may send a purchase confirmation request 118 to the mobile computing device 104 and wait to receive a confirmation 120 from the mobile computing device 104. In so doing, the subsystem 310 may be configured to perform the following: receive transactional information from a merchant 101 regarding a pending transaction; determine an associated account 320 with the transactional information; send a confirmation request 118 to a mobile computing device 104 of an individual 102 associated with the account 320; receive a confirmation 120; and make a determination based on the confirmation 120 whether to send transactional approval information to the merchant 101.

Figure 4:
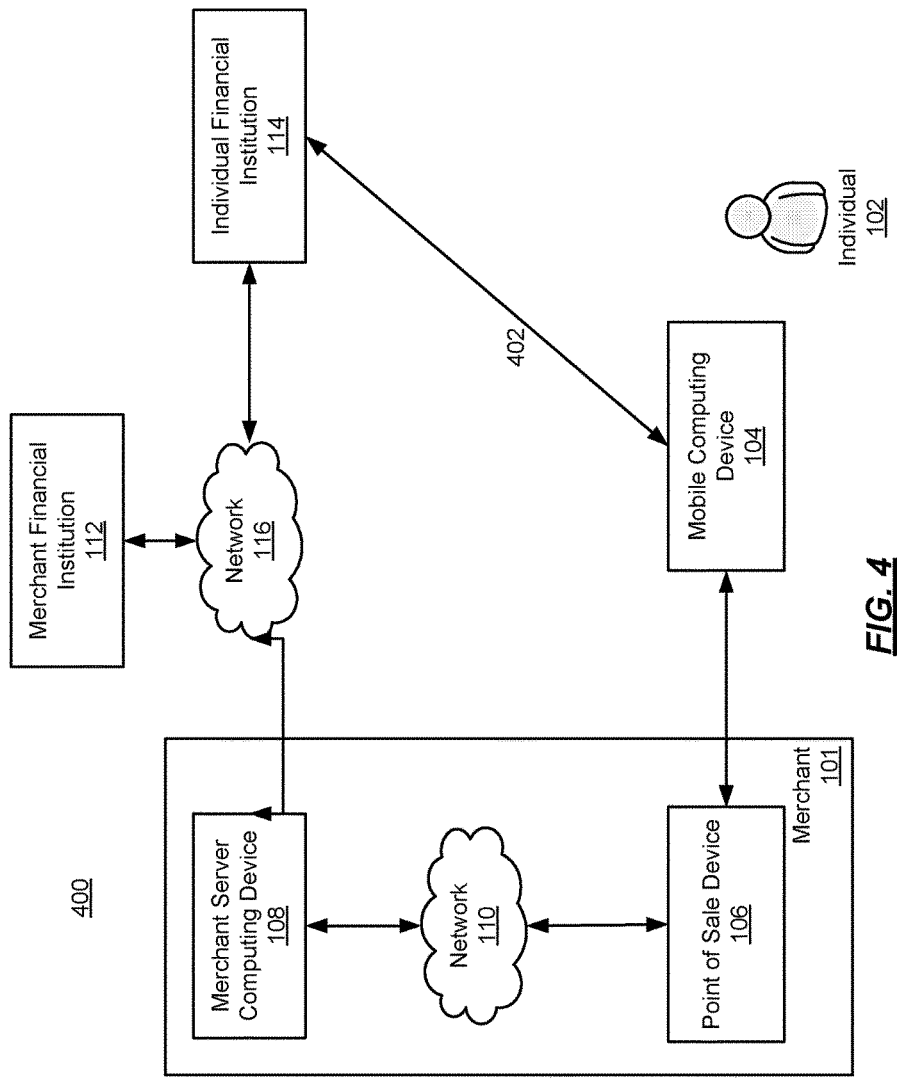
FIG. 4 illustrates another example environment that may be used for payment at a point of sale using a virtual check using a mobile device.

FIG. 4 illustrates an example environment 400 that may be used for payment at a point of sale using a virtual check using a mobile device. Those aspects of FIG. 4 that are similar to FIG. 1 are identified by similar reference numerals. When an individual 102 having a mobile computing device 104 desires to make a purchase from a merchant 101, the mobile computing device 104 may receive transaction information using an NFC or Bluetooth connection with point-of-sale device 106, as described above with regard to FIG. 1. However, rather than using the "virtual checkbook" application on the mobile computing device 104, the individual 102 may use a web browser in the mobile computing device 104 to navigate to a bill payment website offered by the individual financial institution 114. Using the web browser and the bill payment website, the individual 102 may enter or upload information about the transaction to the individual financial institution 114, authorize the transaction, and/or receive confirmations regarding the transaction.

Figure 5:
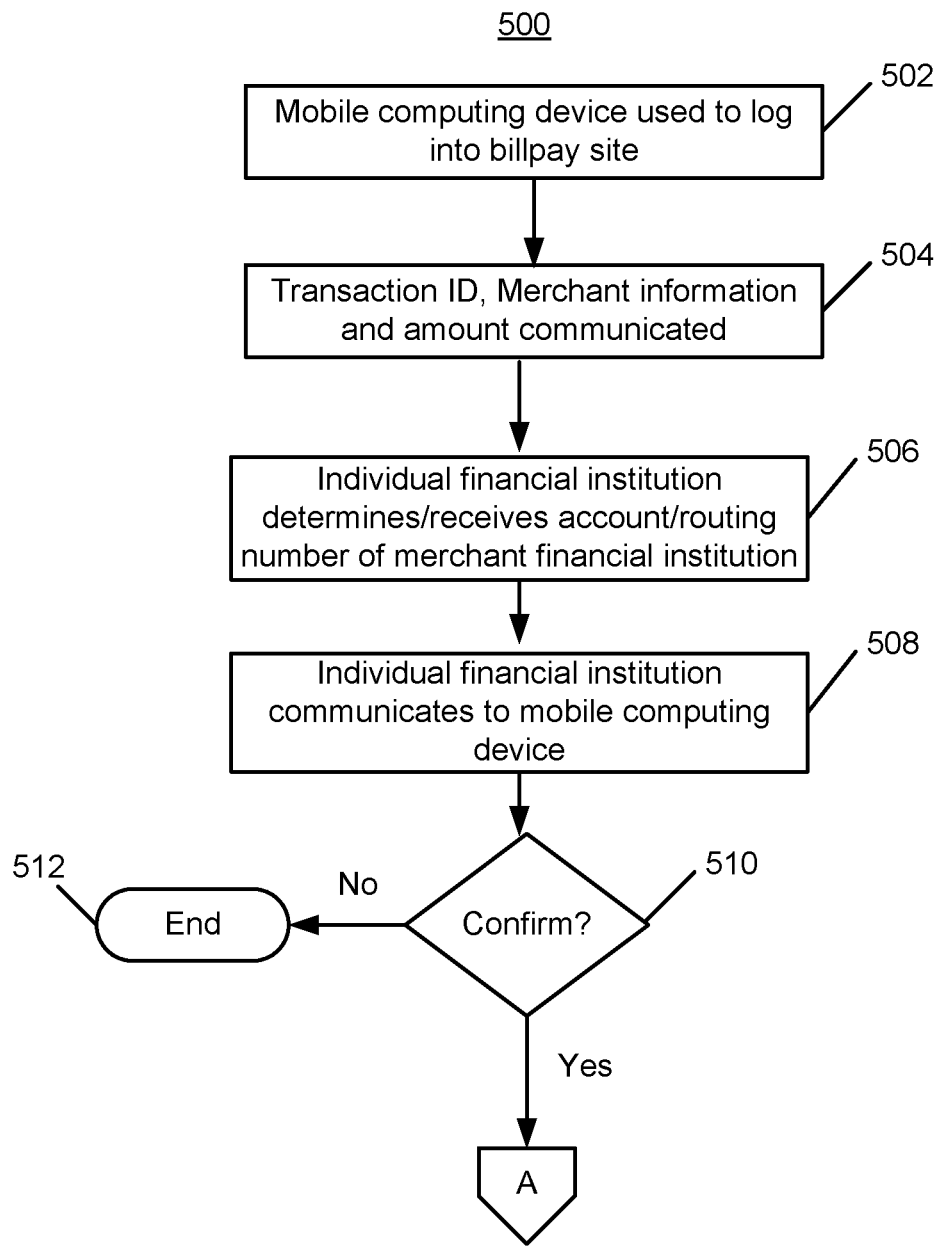
FIG. 5 illustrates another example operation flow whereby transactions may be made using a virtual check.

FIG. 5 illustrates an example operation flow 500 whereby transactions may be made using a virtual check. The individual 102 may wish to complete the transaction with a merchant 101 using the mobile computing device 104. To begin the transaction, at 502, the mobile computing device is used to log into a Web bill pay site. For example, the user one or two may launch a Web browser loaded on the mobile computing device 104 and enter the URL of the Web bill pay site associated with the individual financial institution 114. The individual may authenticate with the individual financial institution 114 by entering a username/password combination, biometric information, etc.

At 504, a transaction ID, merchant information, and amounts of the transaction are communicated to the individual financial institution. For example, using the NFC or Bluetooth connection between the mobile computing device 104 and the point-of-sale device 106, this information may be passed from the point-of-sale device 106 to the mobile computing device 104 and uploaded to the individual financial institution 114 through the Web bill pay site. Alternatively, the individual one or two may enter this information manually into a Web browser and submit it to the individual financial institution through the Web bill pay site.

At 506, the individual financial institution determines or receives the account and routing information associated with the merchant financial institution and the merchant. This information may be received in a communication at 504, or may be derived based on information stored by the individual financial institution 114 about the merchant 101 and the merchant financial institution 112.

At 508, the individual financial institution communicates the mobile computing device to request a confirmation. The confirmation may be communicated as a webpage that is communicated from the individual financial institution 114 to the mobile computing device 104. At 510, it is determined if a confirmation is received. The confirmation may be received from the mobile computing device 104 as a user input to the webpage communicated at 508. If no confirmation is received, the process ends at 512. If a confirmation is received at 510, then the process continues at 218 (FIG. 2B) and proceeds as described above.

Thus, as described above, implementations of the present disclosure provide for payments using a mobile device that are processed as "virtual checks." Such processing may be performed using the same backend systems that are used to process paper checks. In addition, such processing eliminates the credit card transaction fees that are charged to merchants, while provides a near instantaneous transfer of funds from the individual bank account to the merchant bank account.

It should be noted that the various aspects of the presently disclosed subject matter may be implemented in various combinations of the components discussed with reference to FIGS. 1-5 and on the exemplary computing device discussed with reference to FIG. 6.

Exemplary Computing Arrangement

Figure 6:
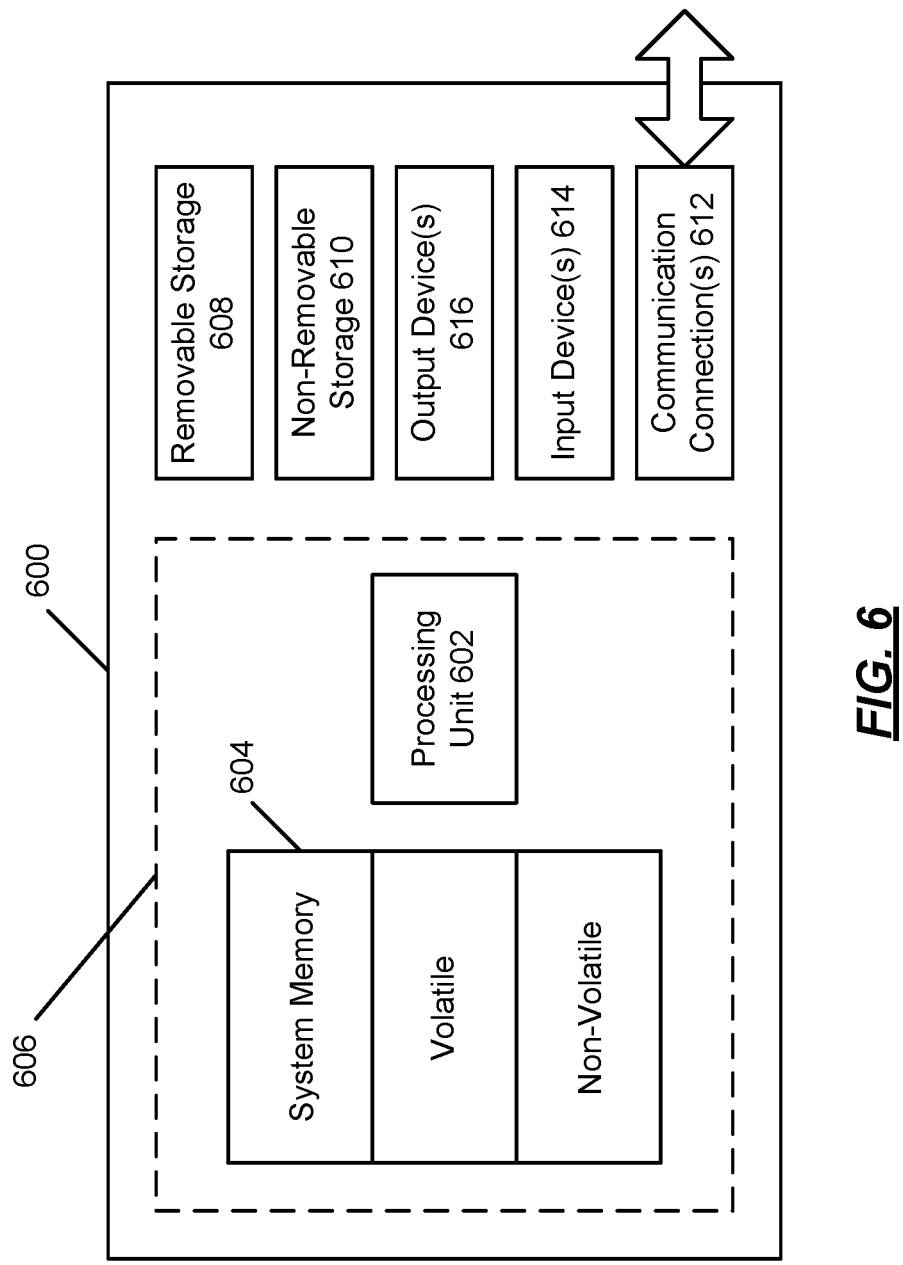
FIG. 6 shows an exemplary computing environment in which example aspects may be implemented.

FIG. 6 shows an exemplary computing environment in which example aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, PCs, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules being executed by a computer, may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and system memory 604. Depending on the exact configuration and type of computing device, system memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing device 600 may have additional features and/or functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer-readable media. Computer-readable media can be any available media that can be accessed by computing device 600 and include both volatile and non-volatile media, and removable and non-removable media. By way of example, and not limitation, computer-readable media may comprise computer storage media and communication media.

Computer storage media include volatile and non-volatile, and removable and non-removable media implemented in any method or technology for storage of information such as computer-readable instructions, data structures, program modules or other data. System memory 604, removable storage 608, and non-removable storage 610 are all examples of computer storage media. Computer storage media include, but are not limited to, RAM, ROM, Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may also contain communication connection(s) 612 that allow the computing device 600 to communicate with other devices. Communication connection(s) 612 is an example of communication media. Communication media typically embody computer-readable instructions, data structures, program modules, or other data in a modulated data signal such as a carrier wave or other transport mechanism, and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media. The term computer-readable media as used herein includes both storage media and communication media.

Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

Computing device 600 may be one of a plurality of computing devices 600 inter-connected by a network. As may be appreciated, the network may be any appropriate network, each computing device 600 may be connected thereto by way of communication connection(s) 612 in any appropriate manner, and each computing device 600 may communicate with one or more of the other computing devices 600 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
    a point of sale device configured to:
        generate a transaction identifier that uniquely identifies a transaction between a merchant and a mobile computing device associated with a customer,
        send the transaction identifier to the mobile computing device via a first communication network,
        after receiving an authorization and an identifier of the mobile computing device, transmit the transaction identifier and the identifier of the mobile computing device to a merchant server computing device;
    the merchant server computing device configured to:
        transmit the transaction identifier together with the identifier of the mobile computing device to a financial institution computing device; and
    the financial institution computing device configured to:
        receive the transaction identifier and the identifier of the mobile computing device,
        send a confirmation request to the mobile computing device using the transaction identifier and the identifier of the mobile computing device, and
        when a confirmation is received from the mobile computing device in response to the confirmation request within a time period, transfer funds from a customer account to a merchant account via a second communication network.

2. The system of claim 1, wherein the identifier of the mobile computing device comprises one of a telephone number.

3. The system of claim 1, wherein the first communication network is a network with a range of less than ten feet.

4. The system of claim 3, wherein the first communication network is a near field communication (NFC) radio communications link.

5. The system of claim 1, wherein the mobile computing device comprises a virtual checkbook application, wherein the virtual checkbook application includes a check register interface that displays recent transactions and a running account balance that reflects the transfer of funds from the customer account to the merchant account.

6. The system of claim 1, wherein the virtual checkbook application uses colors to indicate a change in the running account balance.

7. The system of claim 1, wherein the financial institution computing device is further configured to notify the point of sale device of the completed transaction, and wherein the point of sale device is further configured to print a receipt.

8. The system of claim 1, wherein the first communication network is different from the second communication network.

9. The system of claim 1, wherein the financial institution computing device is further configured to:
    when the confirmation is not received from the mobile computing device in response to the confirmation request within the time period, send a second confirmation request to a second mobile computing device.

10. The system of claim 1, wherein the financial institution computing device is further configured to receive configuration parameters associated with the confirmation request and the confirmation, wherein the configuration parameters include the time period by which the confirmation is to be received and a threshold amount of the transaction.

11. The system of claim 10, wherein the financial institution computing device is further configured to when a confirmation is not received from the mobile computing device in response to the confirmation request within the time period, allow the transaction when the amount of the transaction is less than the threshold amount.

12. The system of claim 10, wherein the financial institution computing device is further configured to when a confirmation is not received from the mobile computing device in response to the confirmation request within the time period, send a second confirmation request to the mobile computing device when the amount of the transaction is greater than the threshold amount.

13. A non-transitory computer-readable storage medium containing a set of instructions that, when executed by one or more processors, cause a machine to:
    generate a transaction identifier that uniquely identifies a transaction between a merchant and a mobile computing device associated with a customer;
    send the transaction identifier to the mobile computing device via a first communication network; and
    after receiving an authorization and an identifier of the mobile computing device, transmit the transaction identifier and the identifier of the mobile computing device to a merchant server computing device,
        wherein the merchant server computing device is configured to transmit the transaction identifier together with the identifier of the mobile computing device to a financial institution computing device,
        wherein the financial institution computing device configured to:
            receive the transaction identifier and the identifier of the mobile computing device,
            send a confirmation request to the mobile computing device using the transaction identifier and the identifier of the mobile computing device, and
            when a confirmation is received from the mobile computing device in response to the confirmation request within a time period, transferring funds from a customer account to a merchant account via a second communication network.

14. The non-transitory computer-readable storage medium of claim 13, wherein the mobile computing device comprises a virtual checkbook application, wherein the virtual checkbook application includes a check register interface that displays recent transactions, and a running account balance that reflects the transfer of funds from the customer account to the merchant account.

15. The non-transitory computer-readable storage medium of claim 14, wherein the virtual checkbook application uses colors to indicate a change in the running account balance.

16. The non-transitory computer-readable storage medium of claim 13, wherein the financial institution computing device is further configured to notify the point of sale device of the completed transaction, and wherein the point of sale device is further configured to print a receipt.

17. The non-transitory computer-readable storage medium of claim 13, wherein the first communication network is different from the second communication network.

18. The non-transitory computer-readable storage medium of claim 13, wherein the financial institution computing device is further configured to:
when the confirmation is not received from the mobile computing device in response to the confirmation request within a threshold period of time, send a second confirmation request to a second mobile computing device.

19. A method comprising:
generating, by a point of sale device, a transaction identifier that uniquely identifies a transaction between a merchant and a mobile computing device associated with a customer;
sending, by the point of sale device, the transaction identifier to the mobile computing device via a first communication network; and
after receiving an authorization and an identifier of the mobile computing device, transmitting, by the point of sale device, the transaction identifier and the identifier of the mobile computing device to a merchant server computing device,
wherein the merchant server computing device is configured to transmit the transaction identifier together with the identifier of the mobile computing device to a financial institution computing device,
wherein the financial institution computing device configured to:
receive the transaction identifier and the identifier of the mobile computing device,
send a confirmation request to the mobile computing device using the transaction identifier and the identifier of the mobile computing device,
when a confirmation is received from the mobile computing device in response to the confirmation request within a time period, transferring funds from a customer account to a merchant account via a second communication network, and
wherein the first communication network is different from the second communication network.

20. The method of claim 19, wherein the mobile computing device comprises a virtual checkbook application, wherein the virtual checkbook application includes a check register interface that displays recent transactions and a running account balance that reflects the transfer of funds from the customer account to the merchant account.

\* \* \* \* \*